Patented Mar. 23, 1948

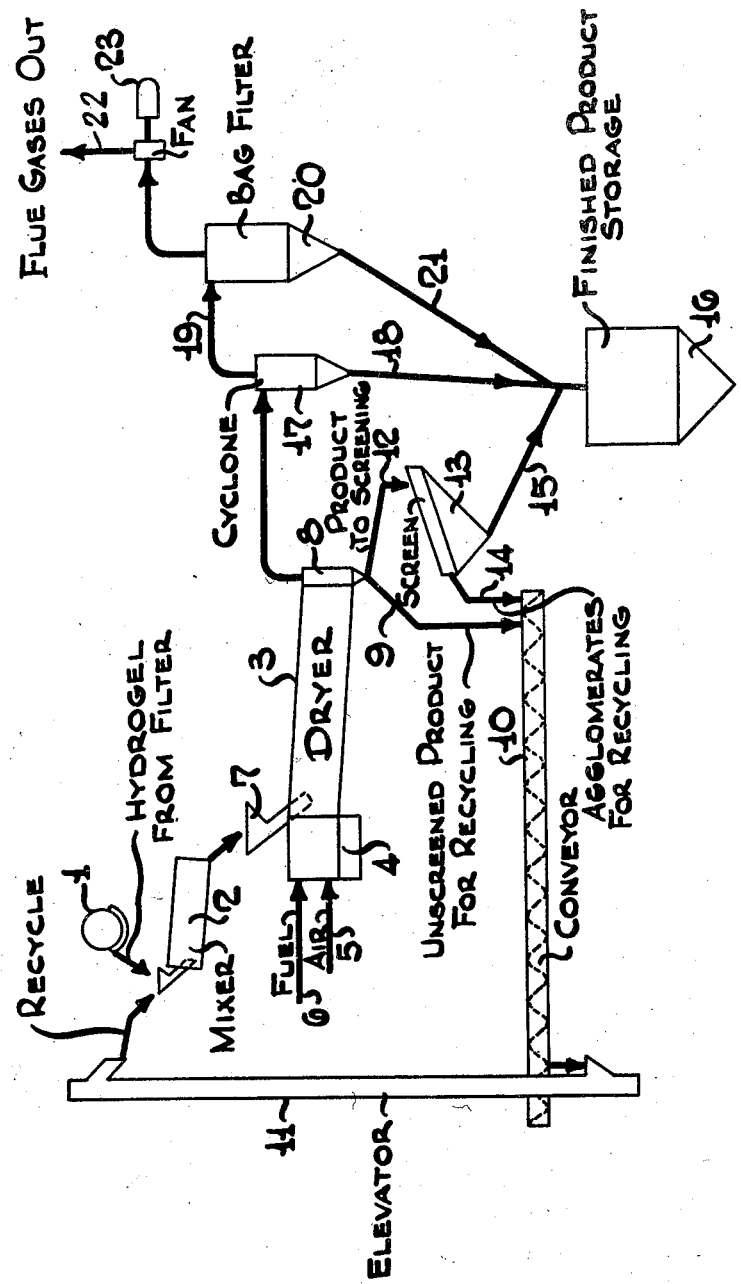

2,438,450

UNITED STATES PATENT OFFICE 2,438,450

DRYING OF MICROSPHERICAL GELS

Karl J. Nelson, Cranford, N. J., assignor to Standard Oil Development Company, a corporation of Delaware Application February 17, 1945, Serial No. 578,437

3 Claims. (Cl. 34—11)

This invention relates to a process for the drying of hydrous oxides and more particularly relates to the manufacture of an improved gel in spherical form having a low apparent density.

Inorganic gels are well known and have long been used for various purposes, for example, for the adsorption of condensable vapors from gaseous carriers and for catalytic purposes either as the catalyst itself or as a component thereof or as a carrier. The most widely used of these inorganic gels in the dried condition is that of silica with or without the addition of other gelatinous materials such as alumina.

Such gels have been found to be particularly useful as catalysts for carrying out reactions involving hydrocarbons and particularly in the so-called fluid catalyst process in which the catalyst is in a finely powdered form and is aerated or fluidized by means of a gas so that it behaves similar to a liquid, exhibiting properties such as fluid flow, hydrostatic pressure, and the like. The hydrostatic property of these powdered catalysts is particularly useful in circulating the catalyst through the system. These powdered catalysts are generally prepared by grinding silica gel or other types of gels to the desired size. It has recently been found that catalysts having a particle size within the desired range for the fluid catalyst process, that is between 20 and 500 microns, can be prepared by causing a sol of the desired gel-forming substance to set while dispersed in a water-immiscible liquid, such as oil, whereby small spherical particles having diameters less than one millimeter are obtained. The microspheres thus obtained are washed and dried, usually in air, and then heated to a temperature between 850° and 1200° F. for purposes of activation. When the catalyst is to be used in the fluid process activation may be omitted since the operating temperatures employed (800°–1100° F.) cause activation while catalyst is circulating in the process. However, during the drying step, it has been observed that these small spheres tend to agglomerate to such an extent that the advantage of the spherical form is lost. Furthermore, it is found that the activity of the spheres thus dried is rather low. This is indicated by the relatively high apparent density and correspondingly low average pore size. Methods have already been disclosed for preventing agglomeration during drying such as by drying in the presence of solvents such as kerosene, alcohols, ketones, etc. or in the presence of surface active agents, such as lecithin, sulfonic acids, etc. These methods, however, are expensive and in the case of solvent drying are difficult to carry out on a continuous flow basis.

In general butanol drying has given a product of good catalytic activity and stability and well preserved microspherical form practically free of agglomeration; however, the apparent density is only about 0.3 to 0.4 which appears to be too low for the best operation in fluid units. Kerosene drying produces a product of suitable apparent density (0.6 to 0.7) and good catalytic properties. The density of the kerosene dried material composes favorably with that of air drying which gives a product having an apparent density of 0.5 to 0.7. Moreover, suspending the hydrogel in Varsol is quite difficult and has required considerable agitation with the result that damage to the particles has resulted. For this reason the Varsol dried samples have usually contained a great many broken fragments and have not had the good appearance of the butanol dried samples when viewed under the microscope.

It is, therefore, one object of this invention to prepare a catalyst having a density suitable for use in the powdered catalyst process.

It is another object of this invention to provide a process for drying microspherical catalysts in which the spherical form is not lost during the drying step.

A further object of this invention is to dry hydrogel spheres under such conditions that they do not agglomerate to form larger particles.

These and other objects of this invention are accomplished by first forming the hydrogel of the desired gel-forming substance and then drying the hydrogel in the presence of previously dried microspherical particles.

The drying of the spherical hydrogels in the presence of the previously dried material may be carried out in any desired manner as long as the wet and dry particles are intimately mixed. The dried particles may come from any convenient source. In practice, however, it is preferable to operate in a continuous process in which a portion of the dried particles are recycled to the fresh feed to the drier.

In this process the amount of dried microspheres recycled may vary over a wide range. For instance, successful drying without agglomeration can be obtained wherein the weight of dried microspheres range from 5 to 300% by weight of the incoming wet fresh feed. Higher percents of dried microspheres can be used but the advantage gained is small. The importance of this process is vested in the fact that conventional air drying equipment can be used such as direct or indirectly fired rotary dryers, tray dryers, belt-chamber dryers, etc. The heat required to allow the recycled dry product to pass through dryer is small; in fact, essentially negligible in comparison with the heat required to dry the wet microspheres.

Mixing of the dried product can be carried out in conventional mixing equipment such as in a tumbling drum or cylinder, screw conveyor or a wide clearance kneader, etc. It may also be desirable to screen the mixture before charging to the dryer and recirculating the large particles back to the mixing operation. An intimate mixture of dried product and wet microspherical hydrogel is required.

To the accomplishment of the foregoing and related ends, the invention, then comprises the features hereinafter fully described, and particularly pointed out in the claims, the following description and the annexed drawing setting forth in detail certain illustrative embodiments of the invention, these being indicative, however, of but a few of the various ways in which the principle of the invention may be employed.

Referring, therefore, to the drawing, wet microspheres from a filter 1 are introduced into mixer 2 which feeds into rotary dryer 3. Drier 3 rotates on its axis and is fitted with a gas or liquid fuel fired furnace 4 into which air and fuel are introduced through lines 5 and 6 respectively. The microspheres enter drier 3 through feed chute 7 and the rotary drier, which is provided with internal lifting flights, showers the microspheres through the hot flue gases from furnace 4 as well as conveys the material to the discharge breaching 8. The heat from the gases effects drying of the spheres; the temperature of the gases leaving the discharge breaching 8 is normally held between 250°–600° F. The major portion of the dried microspherical gel particles leave through the bottom of the discharge breaching and are conveyed either by line 9, conveyor 10 and elevator 11 to mixer 2 for mixing with the wet spheres introduced from filter 1 or by line 12 to screen 13 where agglomerated material is separated from unagglomerated material. Agglomerated material is passed by line 14 to conveyor 10 when it is mixed with the dried material being recycled to the mixer 2. Unagglomerated material is passed by line 15 to storage hopper 16. The gases from the drier still contain small amounts of gel particles which must be removed. These gases are therefore passed to cyclone 17 where most of the remaining gel particles are removed and passed to storage through line 18. Gases are removed from cyclone 17 through line 19 and passed to bag filter 20 where the remaining portions of gel particles are removed and conveyed to storage through line 21. The flue gases free from gel particles are finally vented to the atmosphere through line 22 by fan 23.

When air drying 100% wet microspheres, from 30 to essentially 100% of these particles are agglomerated. When using the mixed feed of this invention, agglomeration is less than 10% of the product and with continuous recycling of the agglomerated particles as part of the total recycled material the wet microspheres are dried with no agglomeration. The advantages obtained by operating according to this invention are indicated in the following results.

Example 1

A series of tests were run using a 6" diameter rotary dryer, 36" long, employing both concurrent and countercurrent flow conditions while feeding 100% wet microspherical gel. Feed rates ranging from 30 to 80 grams per minute were used and the entering flue gases were at 500–1000° F. The majority of the product was recovered in the discharge breaching and the remainder was collected in the bag filter. Both fractions from each run were examined under the microscope. It was found that the material from the breaching was 70–100% agglomerated and the bag filter product contained 30–70% agglomerates.

Example 2

A second series of tests were run using a feed prepared by filtering as dry as possible silica microspherical hydrogel on a Büchner filter. The gel was removed from the Büchner, placed in a container and a measured amount of dry unagglomerated microspherical gel added. These components were directly mixed and then screened through a Tyler #28 mesh sieve.

The material was fed to the rotary dryer as in Example 1 at feed rates ranging from 30–80 grams per minute while employing concurrent as well as countercurrent flow conditions. The product from both the discharge breaching and the bag filter was collected and the weight of the agglomerated particles determined. The following data were obtained:

| Run No. | Total Feed, grams | | | Product, Wt. per cent Agglomerates based on dried gel from hydrogel in feed |
|---|---|---|---|---|
| | Wt. Hydrogel | Wt. Dry Gel | Total | |
| 1 | 1,000 | 600 | 1,600 | 23 |
| 2 | 1,000 | 500 | 1,500 | 18 |
| 3 | 1,000 | 400 | 1,400 | 13 |
| 4 | 1,000 | 300 | 1,300 | 8 |
| 5 | 1,000 | 200 | 1,200 | 4 |
| 6 | 1,000 | 50 | 1,050 | 12 |

It is evident from this example that the use of dried unagglomerated microspherical gel with the wet microspherical gel substantially decreased the amount of agglomeration of the dried gel from the hydrogel fraction of the total feed. Furthermore, the data indicate that the optimum amount of dry gel to add to the wet gel is between 5 and 30% by weight.

Example 3

A third series of experiments were carried out in which 200 grams of previously dried unagglomerated microspherical gel plus 41 grams of agglomerated particles from preceding runs were intimately mixed with 1000 grams of filtered microspherical hydrogel and fed to the dryer as in Examples 1 and 2. The total product from the dryer was screened to remove all agglomerates and such agglomerates were recycled with 200 grams of unagglomerated product with 1000 grams of microspherical hydrogel. This procedure was repeated for six consecutive runs and the following results were obtained:

| Run No. | Wt. of Agglomerates Recycled, Grams | Wt. of Agglomerates in Product, Grams | Product Wt. Per cent Agglomerated based on dried gel from hydrogel in feed |
|---|---|---|---|
| 6 | 41 | 20.2 | 20 |
| 7 | 20.2 | 18.0 | 14 |
| 8 | 18.0 | 12.0 | 10 |
| 9 | 12.0 | 7.7 | 6 |
| 10 | 7.7 | 7.6 | 6 |
| 11 | 7.6 | 7.7 | 6 |

It will be noted that the drying system reached equilibrium with total recycle of agglomerates in run #9 and that with subsequent runs there was no net formation of agglomerates, that is, the fresh microspherical hydrogel dried without agglomeration.

Example 4

A series of experiments were carried out using a feed prepared in the same manner as described in Example 2 but the drying was carried out in a tray dryer using steam heated air. The following results were obtained:

| Run No. | Total Feed, grams | | | Product Wt. Per cent Agglomerated based on dried gel from hydrogel in feed |
|---|---|---|---|---|
| | Wt. Hydrogel | Wt. Dry Gel | Total | |
| 12 | 650 | 200 | 850 | Less than 5%. |
| 13 | 650 | 300 | 950 | Do. |
| 14 | 650 | 400 | 1,050 | Do. |

From the data in the above examples, in view of the minor amount of agglomeration occurring in Examples 2 and 4, it is evident that the lack of agglomeration is a result of the use of mixed feed rather than any mechanical action of the dryer.

The spherical gels prepared according to this invention are particularly suitable as catalysts in the fluid catalyst process for hydrogenating, dehydrogenating, alkylating and cracking hydrocarbons, reforming and desulfurizing naphtha, and for hydrogenating oxides of carbon.

Although the invention has been described in connection with the drying of hydrogel spheres, it is understood that the process of this invention in its broadest concept is adapted to the drying of any type of hydrogel in any shape that it may be found. Furthermore, the precise details enumerated in the above examples, obviously, are not fixed and numerous modifications of the procedures of these examples may be made by those skilled in the art without departing from the spirit and scope of this invention.

That nature and object of the present invention having thus been set forth and specific examples of the same given, what is new and useful and desired to be secured by Letters Patent is:

1. A continuous process for drying microspherical inorganic oxide gel particles which comprises mixing said hydrogel microspheres with 5 to 30% by weight of dry gel microspheres while maintaining the spheroidal condition of the individual hydrogel microspheres so as to prevent the individual hydrogel microspheres from agglomerating, and drying the mixture.

2. A continuous process for drying microspherical inorganic oxide gel particles which comprises mixing the wet gel microspheres with dry gel microspheres while maintaining the spheroidal condition of the individual microspheres in sufficient amount so as to prevent the individual hydrogel microspheres from agglomerating, drying the mixture thus obtained and continuously recycling a portion of the dried gel microspheres to the mixing step.

3. A continuous process for drying microspherical inorganic oxide gel particles which comprises mixing the wet gel microspheres with dry gel microspheres while maintaining the spheroidal condition of the individual microspheres in sufficient amount so as to reduce the tendency of the individual hydrogel microspheres to agglomerate, separating any agglomerated microspheres from the dried microspheres and recycling the agglomerated microspheres to the mixing step as a portion of the dried material used therein.

KARL J. NELSON.

REFERENCES CITED

The following references are of record in the file of this patent:

UNITED STATES PATENTS

| Number | Name | Date |
|---|---|---|
| 1,540,445 | Wilson | June 2, 1925 |
| 1,672,768 | Miller | June 5, 1928 |
| 1,935,176 | Connolly | Nov. 14, 1933 |
| 1,935,178 | Connolly | Nov. 14, 1933 |
| 2,146,718 | Bond | Feb. 14, 1939 |
| 2,326,523 | Connolly | Aug. 10, 1943 |